(12) United States Patent
Rose et al.

(10) Patent No.: US 11,936,981 B1
(45) Date of Patent: Mar. 19, 2024

(54) AUTONOMOUS CAMERA SENSITIVITY ADJUSTMENT BASED ON THREAT LEVEL

(71) Applicant: SimpliSafe, Inc., Boston, MA (US)

(72) Inventors: Zachary William Rose, Natick, MA (US); Kevin Klemm, Waltham, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/511,555

(22) Filed: Nov. 16, 2023

(51) Int. Cl.
*H04N 23/667* (2023.01)
*H04N 23/11* (2023.01)
*H04N 23/61* (2023.01)
*H04N 23/68* (2023.01)

(52) U.S. Cl.
CPC ........... *H04N 23/667* (2023.01); *H04N 23/11* (2023.01); *H04N 23/61* (2023.01); *H04N 23/681* (2023.01)

(58) Field of Classification Search
CPC .... H04N 23/667; H04N 23/61; H04N 23/681; H04N 23/11
USPC ........................................... 348/220.1
See application file for complete search history.

(56) References Cited

U.S. PATENT DOCUMENTS

| | | | |
|---|---|---|---|
| 6,720,874 B2 * | 4/2004 | Fufido | G08B 13/183 340/556 |
| 10,389,982 B1 * | 8/2019 | Fu | H04N 7/185 |
| 10,536,672 B2 * | 1/2020 | Fu | G08B 13/1481 |
| 10,607,478 B1 * | 3/2020 | Stewart | G08B 13/00 |
| 10,891,839 B2 * | 1/2021 | Siminoff | G08B 13/19684 |
| 11,533,457 B2 * | 12/2022 | Martin | G08B 25/10 |
| 2002/0067259 A1 * | 6/2002 | Fufido | G07C 9/28 340/541 |
| 2006/0038680 A1 * | 2/2006 | Eskildsen | G08B 13/193 340/567 |
| 2018/0103200 A1 * | 4/2018 | Bracy | H04N 23/65 |
| 2018/0174413 A1 * | 6/2018 | Siminoff | H04N 7/186 |
| 2018/0176512 A1 * | 6/2018 | Siminoff | H04N 7/188 |
| 2018/0315301 A1 * | 11/2018 | Subramanian | G06F 3/0481 |
| 2019/0327449 A1 * | 10/2019 | Fu | H04N 7/0806 |
| 2021/0074138 A1 * | 3/2021 | Micko | G08B 21/0492 |
| 2023/0040707 A1 * | 2/2023 | Richards | G06T 7/73 |

* cited by examiner

*Primary Examiner* — Pritham D Prabhakher
(74) *Attorney, Agent, or Firm* — Finch & Maloney PLLC

(57) ABSTRACT

Security systems and methods. In one example, a method includes operating a camera in a first mode, based on detection of an alarm condition at a location of the camera, adjusting the camera from the first mode to a second mode, including increasing a sensitivity setting of at least one sensor of the camera, and disabling use of object detection within the camera.

19 Claims, 13 Drawing Sheets

AUTONOMOUS CAMERA SENSITIVITY ADJUSTMENT BASED ON THREAT LEVEL

TECHNICAL FIELD

Aspects of the technologies described herein relate to security systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to techniques for automatically adjusting a security camera when an alarm condition is detected. At least one example is directed to a method. The method includes operating a camera in a first mode, based on detection of an alarm condition at a location of the camera, adjusting the camera from the first mode to a second mode, including increasing a sensitivity setting of at least one sensor of the camera, and disabling use of object detection within the camera.

Another example is directed to a system including a camera. The camera includes a passive infrared sensor configured to detect motion events, a communication interface, a recording application configured to record video imagery, and one or more processors. The processor(s) are configured to alter a configuration of the camera from a first state to a second state based on receiving a signal via the communication interface, the signal being indicative of an alarm condition, wherein to alter the configuration of the camera from the first state to the second state includes to increase a sensitivity of the passive infrared sensor and to disable use of object detection within the camera.

Another example is directed to one or more computer readable media storing sequences of instructions executable to control a security camera disposed at a location. The sequences of instructions comprise instructions to, based on detecting an alarm condition at the location, automatically reconfigure the security camera from a first mode to a second mode having less specificity to threat detection than the first mode. Reconfiguring the security camera from the first mode to the second mode includes increasing a sensitivity of a passive infrared sensor in the security camera from a pre-alarm setting to an alarm setting, and disabling use of object detection within the security camera.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

DETAILED DESCRIPTION

Figure 1:
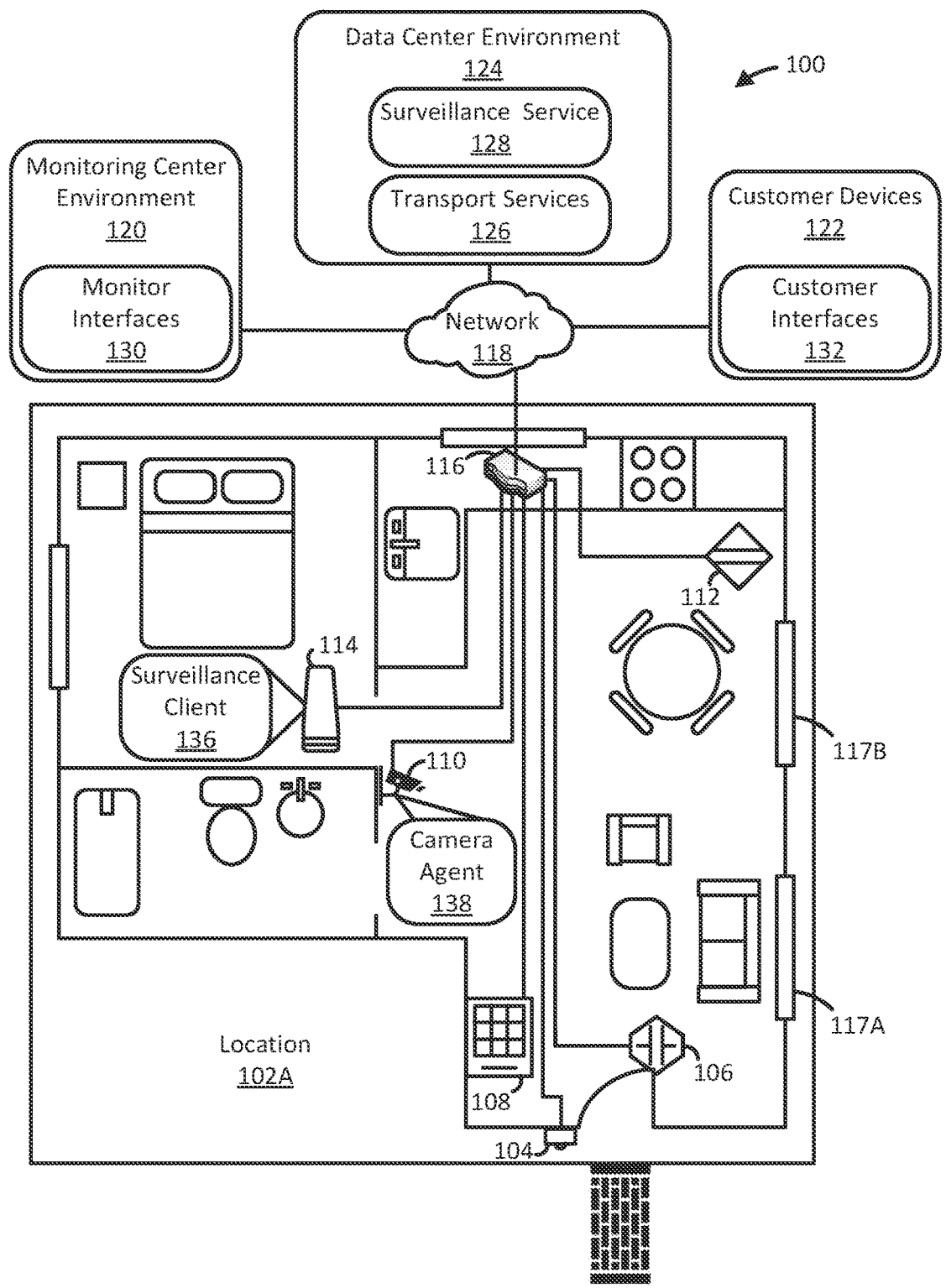
FIG. 1 is a schematic diagram of a security system, according to some examples described herein.

As summarized above, at least some examples disclosed herein are directed to systems and processes for automatically adjusting camera-based motion detection during alarms to support dynamic handling of those alarms by monitoring operations.

According to certain examples, a security system may include one or more image capture devices (e.g., cameras) that are disposed at a monitored location, as described further below. These image capture devices may include a motion sensor, such as a passive infrared (PIR) sensor, as well as an image sensor assembly for acquiring video images at the monitored location. In some examples, the system is configured such that an image capture device triggers an alarm and responsive to detecting motion and/or certain objects of interest. Further, as described in more detail below, the image capture device can be configured to record video imagery of the monitored location.

According to certain examples, the security system is configured to prioritize achieving a high level of confidence of a threat before triggering an alarm. Thus, in a pre-alarm condition, a priority of the system may be to achieve reliability in threat detection so as to minimize false alarms. Therefore, in the pre-alarm condition, the sensitivity of the PIR sensor may be set to a level that is below its maximum sensitivity so as to avoid causing motion-based alarm signals based on benign instances of detected motion, such as moving plants (e.g., waving tree branches), shifting light patterns, shadows, etc. Further, the camera may use video analytics and techniques such as computer vision-based processing, for example, to recognize certain objects (e.g., people or pets) in acquired video images. The system can be configured to trigger an alarm when a recognized object of interest (e.g., a person) is detected, and/or to avoid triggering an alarm signal a recognized benign object (e.g., a pet) is detected. Thus, using these techniques, in the pre-alarm condition, the system can be configured to prioritize reliable threat detection and the minimization of false alarms.

However, once an alarm condition has been initiated, the priority may shift. As the system is already in the alarm condition, there may no longer be any concern regarding potentially triggering a false alarm. Rather, it may become more important to ensure that the image capture device(s) record video imagery of the monitored location so that potential threats can be identified, and appropriate response measures taken. Accordingly, once an alarm condition has begun, the security system can be configured to transition its priority to providing high-availability of video imagery at the monitored location at which the alarm has occurred. To achieve this change in priority, the security system may automatically alter one or more configuration settings of one or more local security cameras. For example, as described further below, a sensitivity of a PIR sensor may be increased, such that a camera triggers an alarm and/or begins/continues video recording in response to instances of motion that it otherwise would ignore. In addition, the use of video analytics to constrain triggering of alarms and/or video recording sessions to certain conditions, as described above, can be disabled. Thus, once in the alarm condition/mode, the camera may have less specificity to threat detection, meaning that it may trigger an alarm and/or initiate/continue video recording in more circumstances than in the pre-alarm condition. In this manner, the availability of video imagery of the monitored location is prioritized over reliability in threat detection until the alarm condition is resolved.

In handling of alarms, various devices of a security system can be configured to allow communication sessions between one or more security devices located at a monitored location and a computing device located remotely from the monitored location. These sessions enable a remotely located user (e.g., a monitoring professional or a customer of a security service) to intervene at a monitored location in the event of a reportable event, such as a break-in. To intervene may include, for example, to interact with one or more security devices at the monitored location to adjust the operation of the same and/or to interact with a person at the monitored location. Such remote intervention can, in some situations, dissuade, deter, or delay theft or other types of harm. Moreover, by allowing a remotely located user to view, hear, and potentially interact with persons at the monitored location, remote interventions supported by communication sessions can help a remotely located user to determine if a dispatch to a monitored location of emergency services and/or law enforcement personnel is warranted.

While intervention by monitoring personnel can be extremely useful in genuine alarm situations, it can be costly and inefficient in the case of false alarms. Furthermore, aspects of an intervention, such as two-way communication via a security camera with a person at the monitored location, may only be useful when the person is within the field of view of the security camera. Accordingly, aspects and examples of the security systems and processes described herein employ alarm-handling techniques whereby intervention by monitoring personnel is limited to those circumstances in which their involvement is likely to add a security benefit. For example, the security system can be configured to employ different response routines (e.g., sets of procedures for handling an alarm, such as calling contacts, dispatching first responders or other personnel, etc.) based on the type of alarm trigger that occurs. In some examples, the security system can be configured to implement either a "standard" response routine or a "priority" response routine, depending on the type of alarm trigger. The standard response routine may include various actions, such as contacting the customer, calling contacts, dispatching in certain circumstances, reviewing recorded video imagery of the monitored location, etc., but may not include immediate intervention by monitoring personnel. The priority response routine, in addition to any or all actions associated with the standard response routine, may also include provisions for monitoring personnel to communicate with a person at the monitored location via two-way audio capabilities associated with the security camera. In some examples, the security system is configured to implement the priority response routine only when a motion alarm signal is triggered by the security camera. For other types of alarm triggers, the security system can be configured to implement the standard response routine. This approach allows the priority response routine to be reserved automatically for those instances when the additional attributes associated therewith, such as real-time two-way communication sessions, are more likely to provide a security benefit. For example, if a person is within the field of view of the security camera, and therefore potentially available to engage in communication with remote monitoring personnel, the presence of that person in the field of view of the security camera will cause the security camera to issue a motion alarm signal, thus triggering the priority response routine.

Thus, according to certain examples, implementation of the priority response routine is triggered in response to motion detection by a security camera. Accordingly, it may be desirable to minimize the risk of the security camera failing to detect a motion event and thus potentially causing the security system to mishandle an alarm by applying the standard response routine instead of the priority response routine when in fact a person is indeed in the field of view of the security camera. For example, it may be desirable to minimize the risk of the security camera, though its motion sensing capabilities, failing to detect a person (or other moving object) that would otherwise be visible to a human viewing the images or video stream captured by the security camera. Accordingly, as described above, once an alarm condition has begun, the security system can be configured to transition its priority to providing high-availability of video imagery at the monitored location at which the alarm has occurred, such as recordings acquired by a local security camera. This change in priority not only increases the availability of recordings during a critical time, but may also mitigate operational noise for monitoring agents. For example, intervention may be implemented while a subject is positioned in front of a security camera, instead of when the system alarm is triggered by a non-video capable device (e.g., a door lock sensor, smoke detector, etc.).

According to certain examples, the security system can be configured to automatically adapt its operating configuration and priorities based on the type of alarm signal generated. For example, as described further below, individual sensors can produce alarm signal messages that include data identifying the type of sensor initiating the alarm signal. Thus, the system can automatically differentiate between alarm signals that are produced by video-capable devices versus those produced by non-video-capable devices. In instances where an alarm condition is triggered by an alarm signal from a video-capable device (e.g., a security camera), the system can immediately implement the priority response routine. In instances where an alarm condition is triggered by a non-video-capable device, the system can implement the standard response routine, but also begin to prioritize the availability of video data in preparation for the possibility of a motion detection event captured on video that could cause the system to transition to the priority response routine.

As described above, in some examples, the change in system priority can be implemented via an automatic change in one or more configuration settings of one or more security cameras at the monitored location to decrease the specificity of the camera to threat detection. For example, the camera can be configured to detect more instances of motion, associate more detected instances of motion with a potential threat, and/or decrease its threshold for initiating recording of video imagery of the monitored location. As described above, during an alarm condition, the sensitivity of one or more motion detection sensors (e.g., a passive infrared sensor) of the security camera(s) can be increased. In addition, or alternatively, any video analytics (e.g., filters and/or processes for person detection, pet detection, etc.) that may otherwise cause the security camera(s) to "reject" a motion detection (e.g., because the video analytics failed to recognize a person or did recognize a pet) can be disabled or "ignored." These adjustments may maximize the likelihood that the security camera(s) will issue alarm signals in response to detected motion during an alarm condition, and thus trigger the system to implement the priority response routine.

Accordingly, in some examples, a process for controlling a security camera includes detecting an alarm condition at a location, and based on detection of the alarm condition, automatically reconfiguring a camera at the location from a first mode to a second mode having less specificity to threat detection than the first mode. In some examples, while the alarm condition persists, the camera can be operated in the second mode. The method may further include detecting termination of the alarm condition, and based on detection of the termination, automatically reconfiguring the camera from the second mode to the first mode.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes various devices disposed at a monitored location 102A, a monitoring center environment 120, a data center environment 124, one or more customer devices 122, and a communication network 118. Each of the monitoring center environment 120, the data center environment 124, the one or more customer devices 122, and the communication network 118 include one or more computing devices (e.g., as described below with reference to FIG. 11). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. In some examples, devices at the monitored location 102A include image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices. Any one or more of the location-based devices may include one or more computing devices (e.g., as described below with reference to FIG. 11).

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the monitored location 102A by way of example only. Other networking technology that involves other computing devices is suitable for use within the monitored location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc.). Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the monitored location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the monitored location 102A support other communication protocols, such as MATT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIGS. 4B & 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate to the base station 114, sensor data indicating whether the front door of the location 102A is open or closed. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of sensor data indicating changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MATT broker that receives messages and transmits responsive messages to MATT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figures 2, 3:
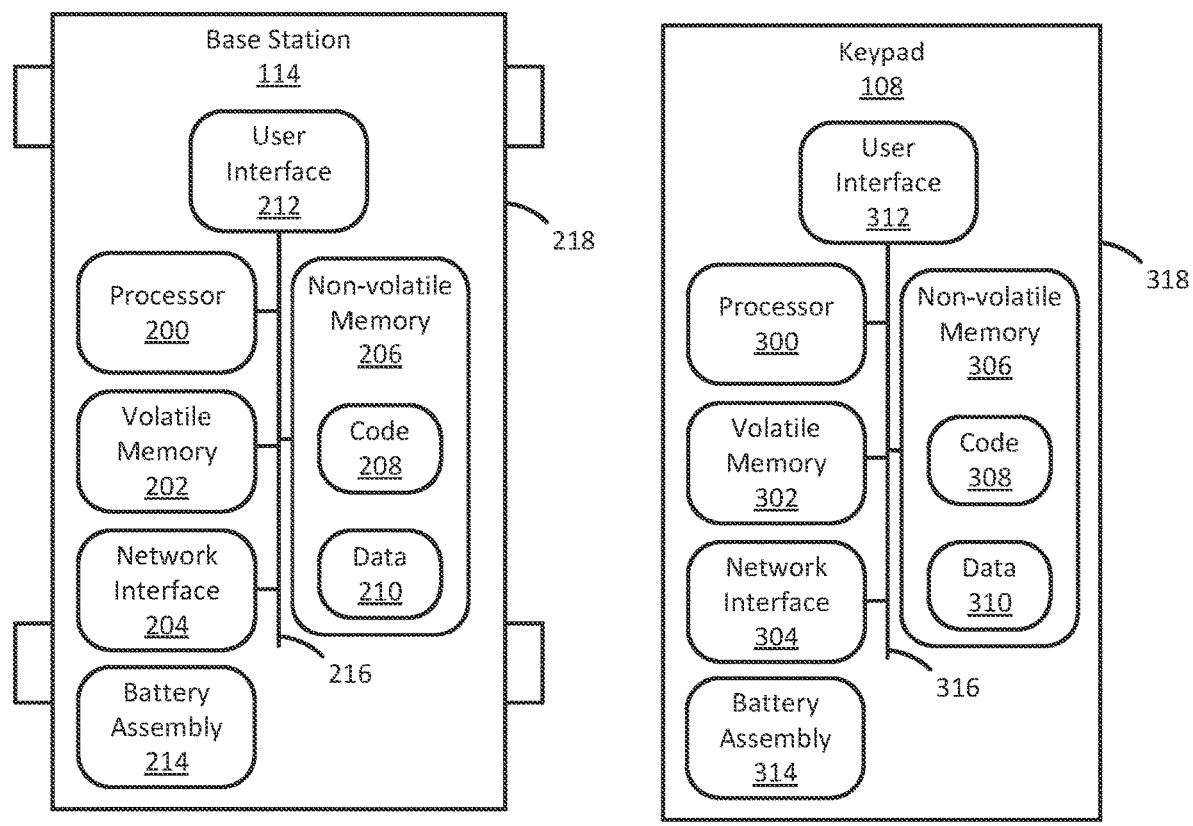
FIG. 2 is a schematic diagram of a base station, according to some examples described herein.
FIG. 3 is a schematic diagram of a keypad, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MATT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, an 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 db siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MATT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
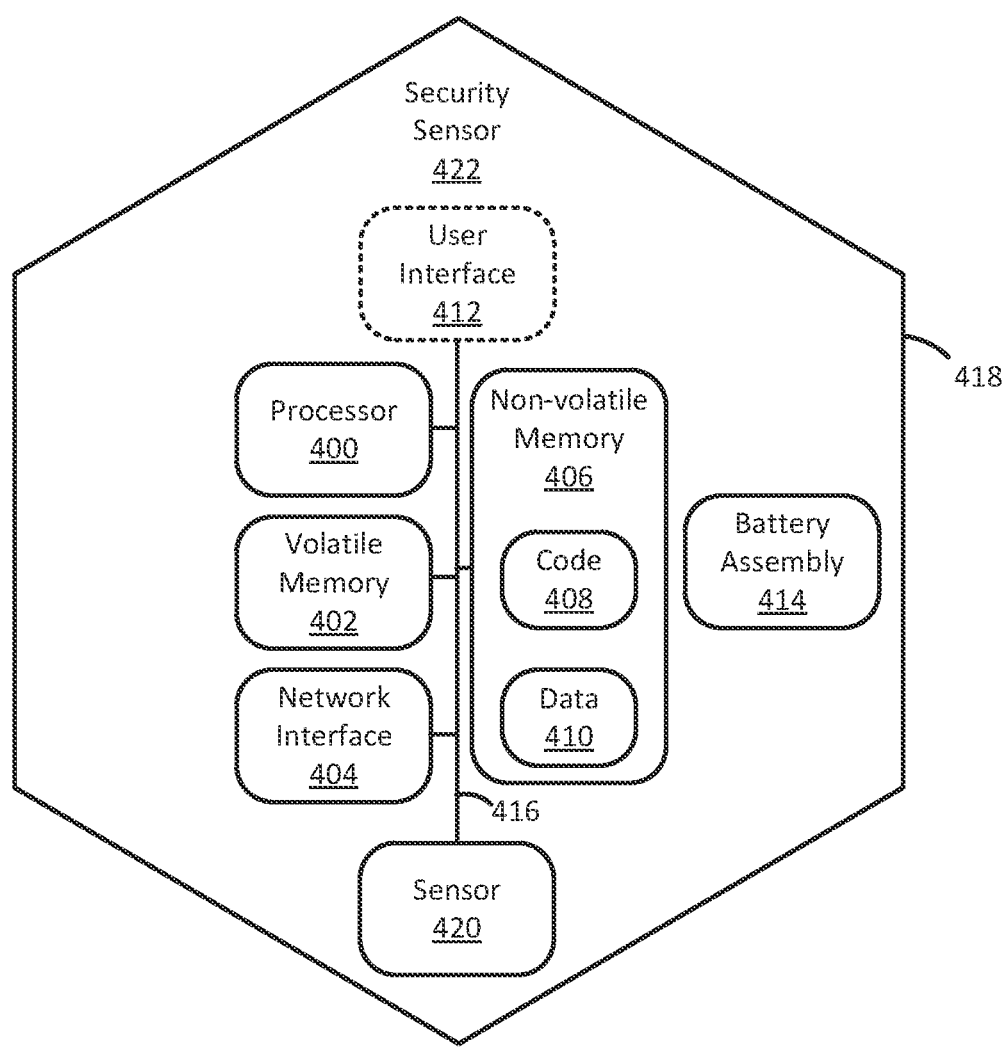
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MATT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
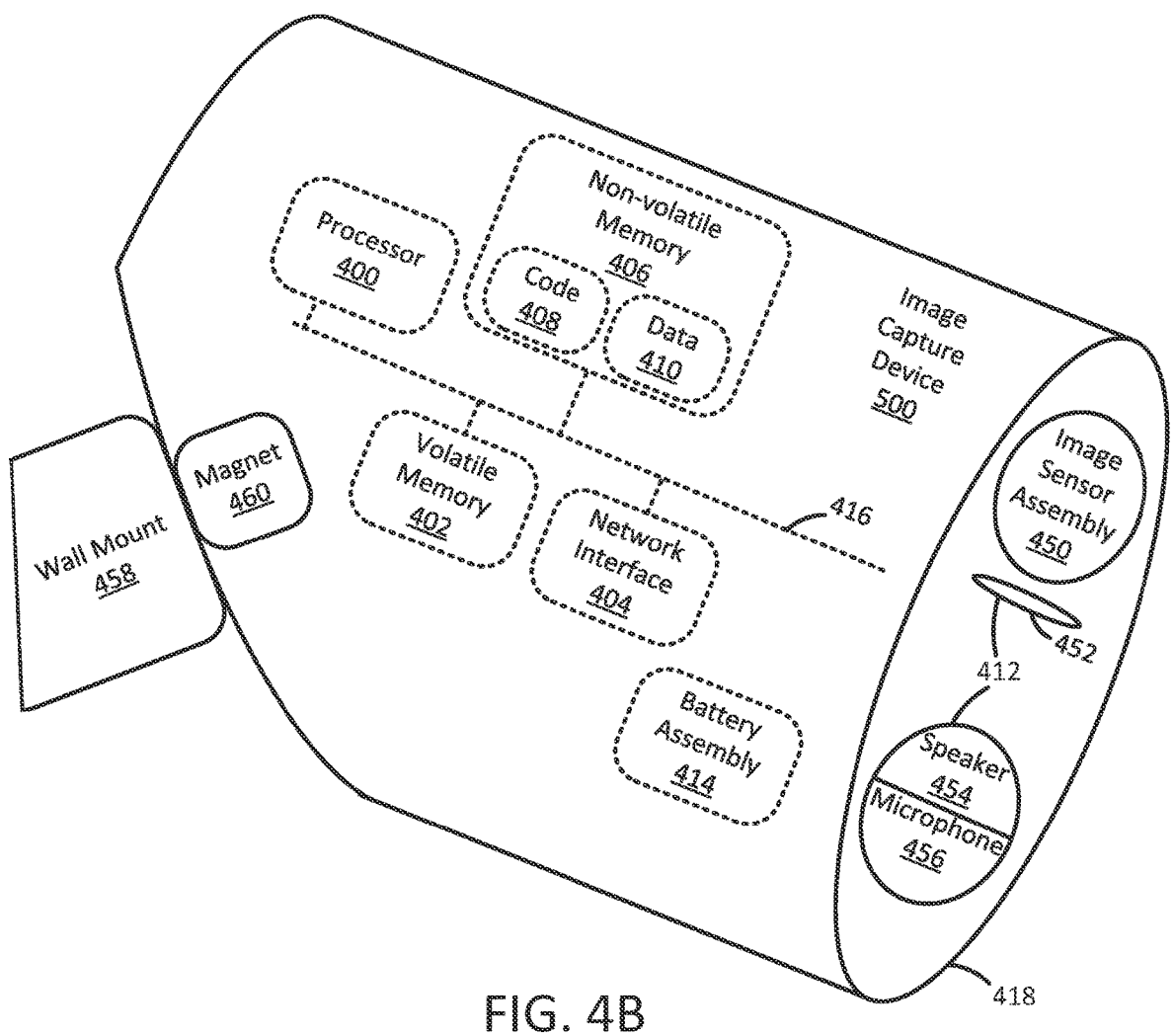
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 db or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128 or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
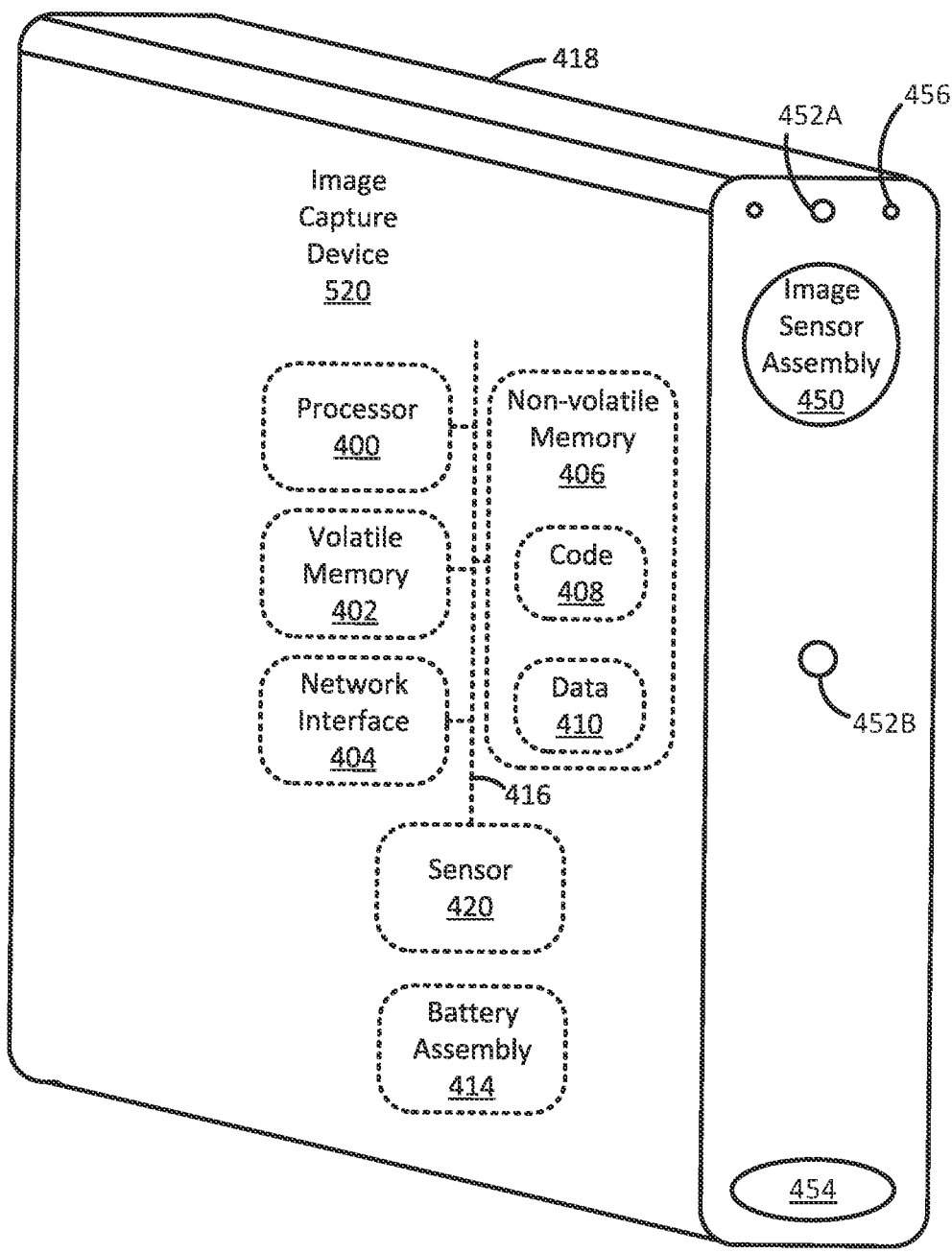
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and 452B, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
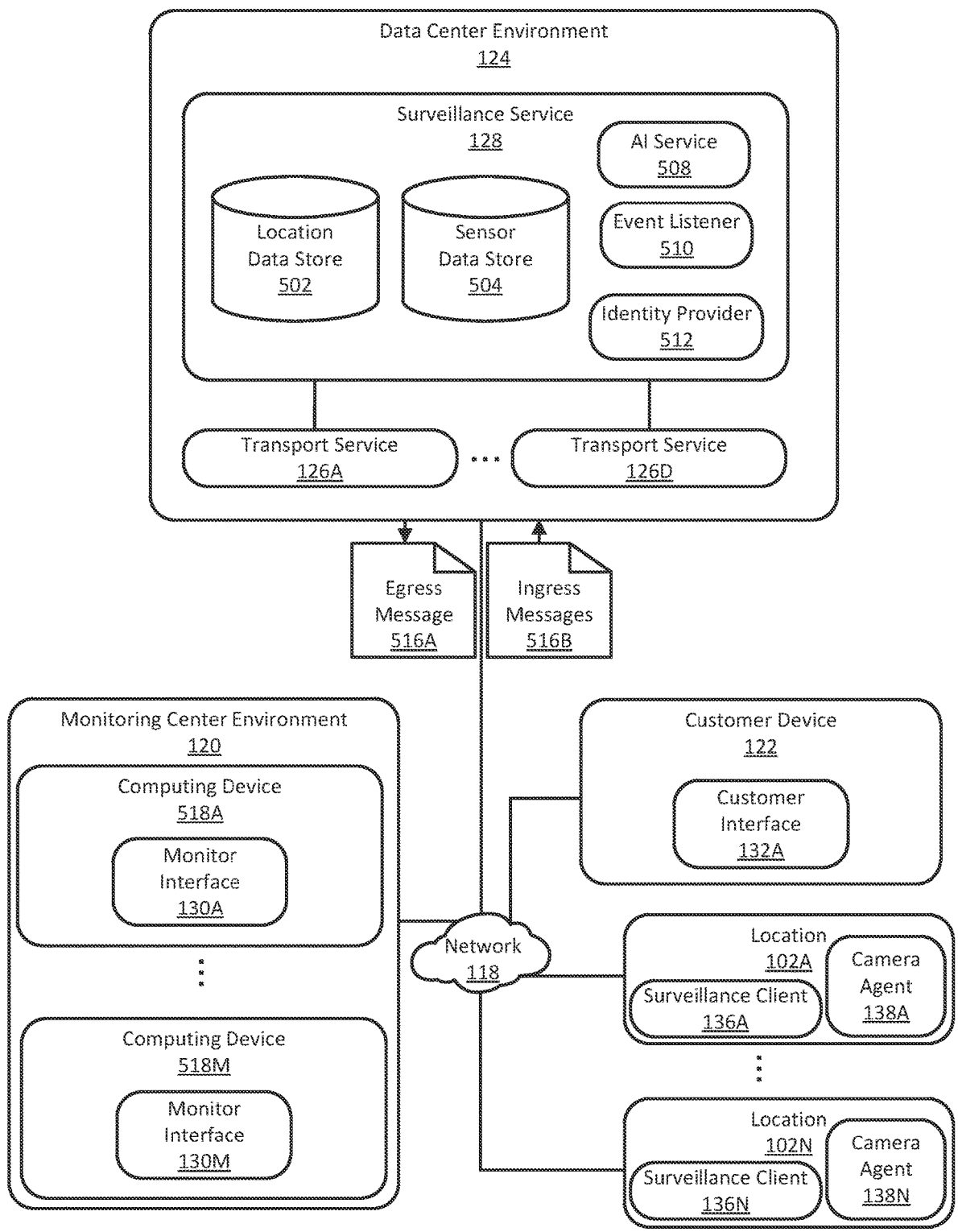
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) separately from other location data but in association with identifiers of locations and timestamps at which the sensor data was acquired. In some examples, the sensor data store 504 is optional and may be use, for example, where the sensor data house therein has specialized storage or processing requirements.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events from sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
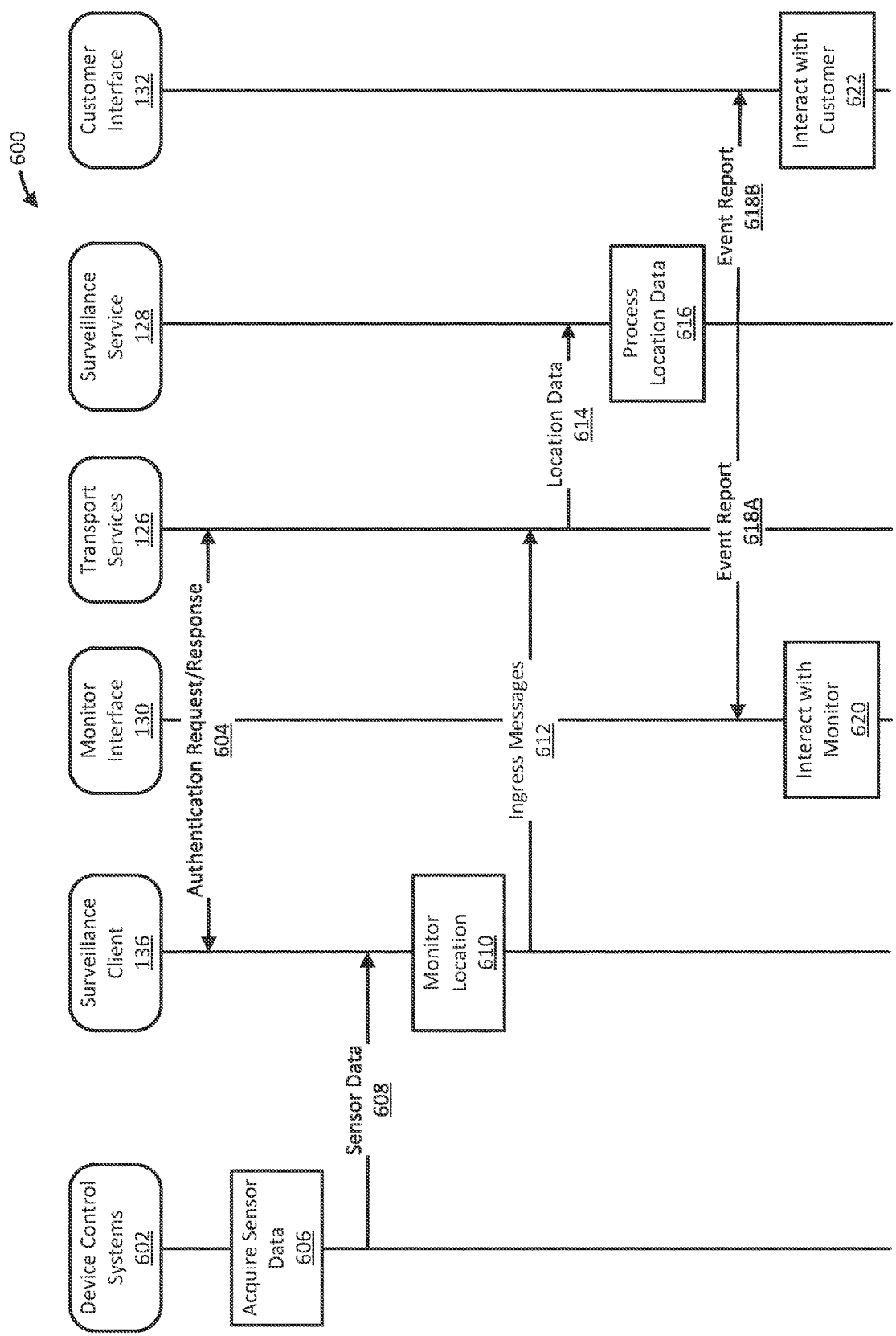
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIGS. 3-4C). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire (at operation 606) sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria (e.g., movement within a particular zone combined with a threat score that exceeds a threshold value). The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more events that warrant reporting to a user. In some examples, the monitor interface 130 is configured to interact with monitoring personnel to both receive input and render output regarding alarms triggered at monitored locations, such as the location 102A. For instance, in some examples, the monitor interface 130 is configured to notify monitoring personnel of the occurrence of alarms at monitored locations, render audio-visual data and other sensor data collected by location-based devices at the monitored locations and stored in the data stores 502 and/or 504, and establish real-time connections with location-based devices. Further, in some examples, the monitor interface 130 includes controls configured to receive input specifying actions taken by the monitoring personnel to address the alarms, such as interacting with actors including customers, customer contacts, dispatchers, and/or first responders called upon to investigate the alarms. These actions can include, for example, taking or making calls from or to customers regarding an alarm; verifying the authenticity of the alarm; making contact with individuals at a location reporting an alarm; calling an appropriate Public Service Answering Point (PSAP) to request dispatch of emergency responders, such as police, fire, or emergency medical services; updating status information regarding such dispatches; updating status information for alarm; and canceling alarms and/or dispatched responders, to name a few actions. Some or all of these and other actions may be translated, by the monitor interface 130, into events that are communicated to the surveillance service 128 via a monitoring API, for example.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
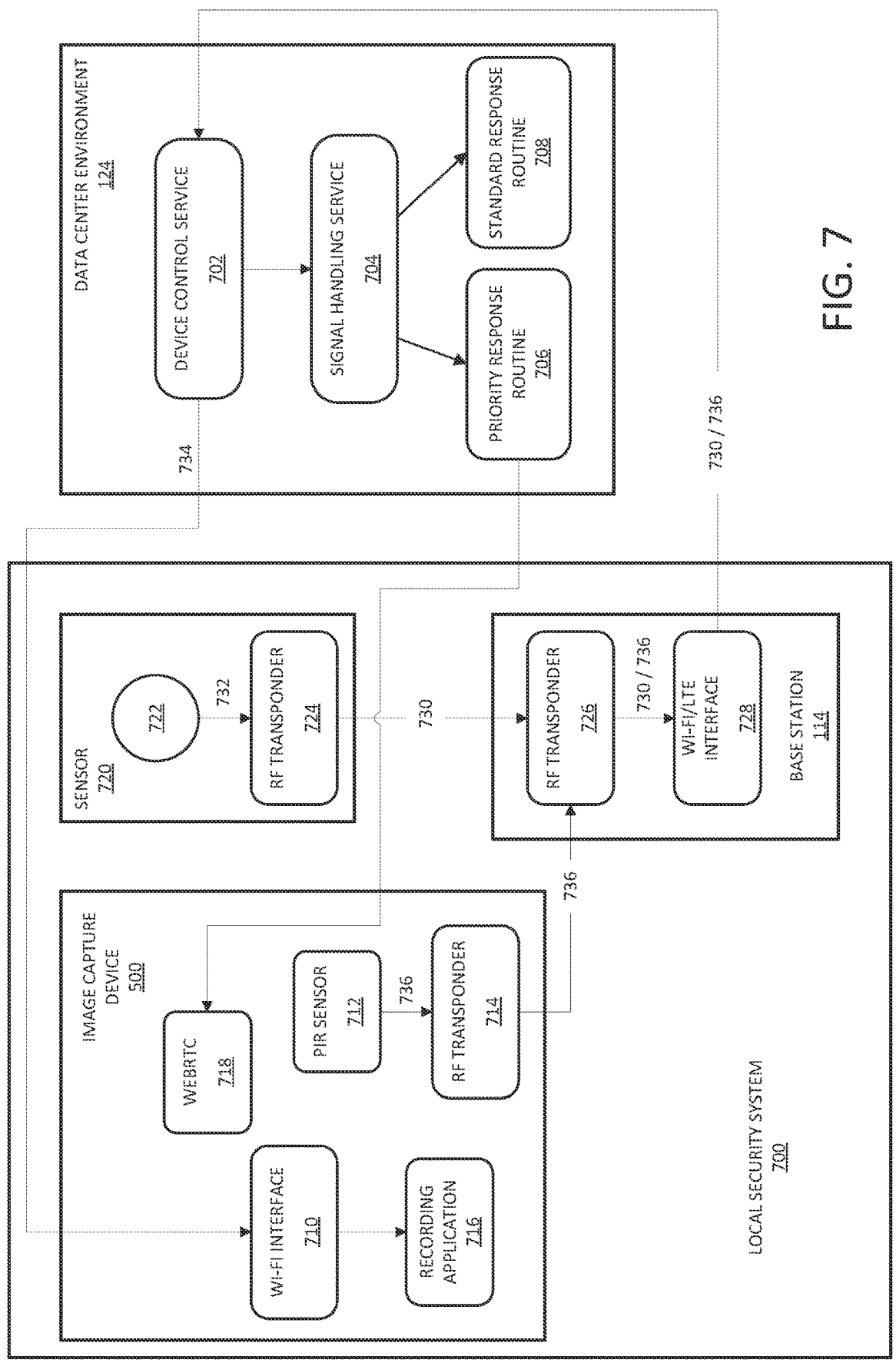
FIG. 7 is a schematic diagram of certain components of a security system according to some examples described herein.

Turning now to FIG. 7, parts of a security system (e.g., the security system 100 of FIG. 1) that are configured to implement adaptive monitoring processes are schematically illustrated. These parts include the data center environment 124 of FIG. 1 and a local security system 700, as may be installed at the monitored location 102A of FIG. 1, for example. In the illustrated example, the local security system 700 includes the image capture device 500, a sensor 720, and the base station 114. The local security system 700 may additionally include various components or devices not illustrated in FIG. 7, such as one or more additional sensors 720, one or more additional image capture devices 500, and/or one of more of any of the devices described above with reference to FIG. 1, for example. As shown in FIG. 7, the data center environment 124 hosts a device control service 702 and a signal handling service 704, which may be or include portions of the surveillance service 128 and/or transport services 126 discussed above. The data center environment 124 is configured to implement different response routines, including a priority response routine 706 and a standard response routine 708, depending on information contained in ingress messages received from the local security system 700, as described further below.

Continuing with the example of FIG. 7, the image capture device 500 includes a wireless interface (e.g., WI-FI interface) 710, which may be part of the network interface 404 discussed above, and which allows the image capture device 500 to receive messages from the data center environment 124 (e.g., via the device control service 702), as discussed further below. The image capture device 500 further includes a sensor (e.g., a PIR sensor) 712, which may be part of the sensor assembly 420, and a transponder (e.g., an RF transponder) 714 for communicating with the base station 114. For example, using the transponder 714, the image capture device 500 may communicate with the base station 114 using a sub-GHz wireless networking standard, as described above. The transponder 714 may be part of the network interface 404. The image capture device 500 further includes a recording application 716 that allows the image capture device 500 to record frames of image data that may be acquired by the image capture device using one or more imaging sensors (e.g., the image sensor assembly 450) and/or audible data that may be collected through a microphone of the image capture device 500 (e.g., microphone 456). The recording application 716 may be executed by the processor 400 in some examples. The image capture device 500 further includes a communications client (e.g., a web real-time communication (WebRTC) client) 718 that allows the image capture device to establish a real-time communication session with external devices (e.g., the monitor interface 130), as described further below. A real-time communication session may refer to any mode of telecommunications in which participants can exchange information instantly or with negligible latency or transmission delays. In this context, the term real-time is synonymous with live. The client 718 may also be part of the network interface 404. It will be appreciated that the image capture device 500 may include various other components not illustrated in FIG. 7, such as, but not limited to, any of the components described above with reference to FIGS. 1, 4B and 4C, for example.

Continuing with the example of FIG. 7, the sensor 720 may include any type of security sensor, such as a glass break sensor, carbon monoxide sensor, smoke detector, water sensor, temperature sensor, door lock sensor, or panic button, for example. In some examples, the sensor 720 includes the contact sensor assembly 106 described above. The sensor 720 includes a sensor trigger 722. In examples in which the sensor 720 is a contact sensor (e.g., the contact sensor assembly 106), the sensor trigger 722 may include a magnetic sensor that can detect the presence or absence of a magnetic field generated by a magnet when the magnet is proximal to the sensor 720. For example, as described above, when the magnetic field is present, the sensor trigger 722 may generate Boolean sensor data specifying a closed state, and when the magnetic field is absent, the sensor trigger 722 may generate Boolean sensor data specifying an open state. The sensor 720 includes a transponder (e.g., an RF transponder) 724 that allows the sensor 720 to communicate sensor data (e.g., in the case of a contact or door lock sensor, indicating whether a door is open or closed) to the base station 114. In some examples, the transponder 724 is configured to operate using a sub-GHz wireless networking standard, as described above.

Continuing with the example of FIG. 7, the base station 114 includes a transponder (e.g., an RF transponder) 726 (which may be part of the network interface 204 described above with reference to FIG. 2) that allows the base station 114 to communicate with, and receive messages/data from, the sensor 720 and the image capture device 500. In some examples, the transponder 726 is configured to allow the base station 114 to communicate with the image capture device 500 and the sensor 720 using a sub-GHz wireless networking standard, as described above. Further, the transponders 714, 724, 726 allow a point-to-point network to be established between the sensor 720 and the base station 114 such that the two devices can communicate without relying on a wireless network established by one or more other devices at the monitored location, such as a network router, for example. The base station 114 further includes a wireless interface 728, such as a WI-FI and/or cellular (e.g., long-term evolution (LTE)) interface, for example, for communicating with the data center environment 124. In some examples, the wireless interface 728 is part of the network interface 204 described above. It will be appreciated that the base station 114 may further include several components not illustrated in FIG. 7, such as any of the components described above with reference to FIGS. 1 and 2, for example.

Figure 8:
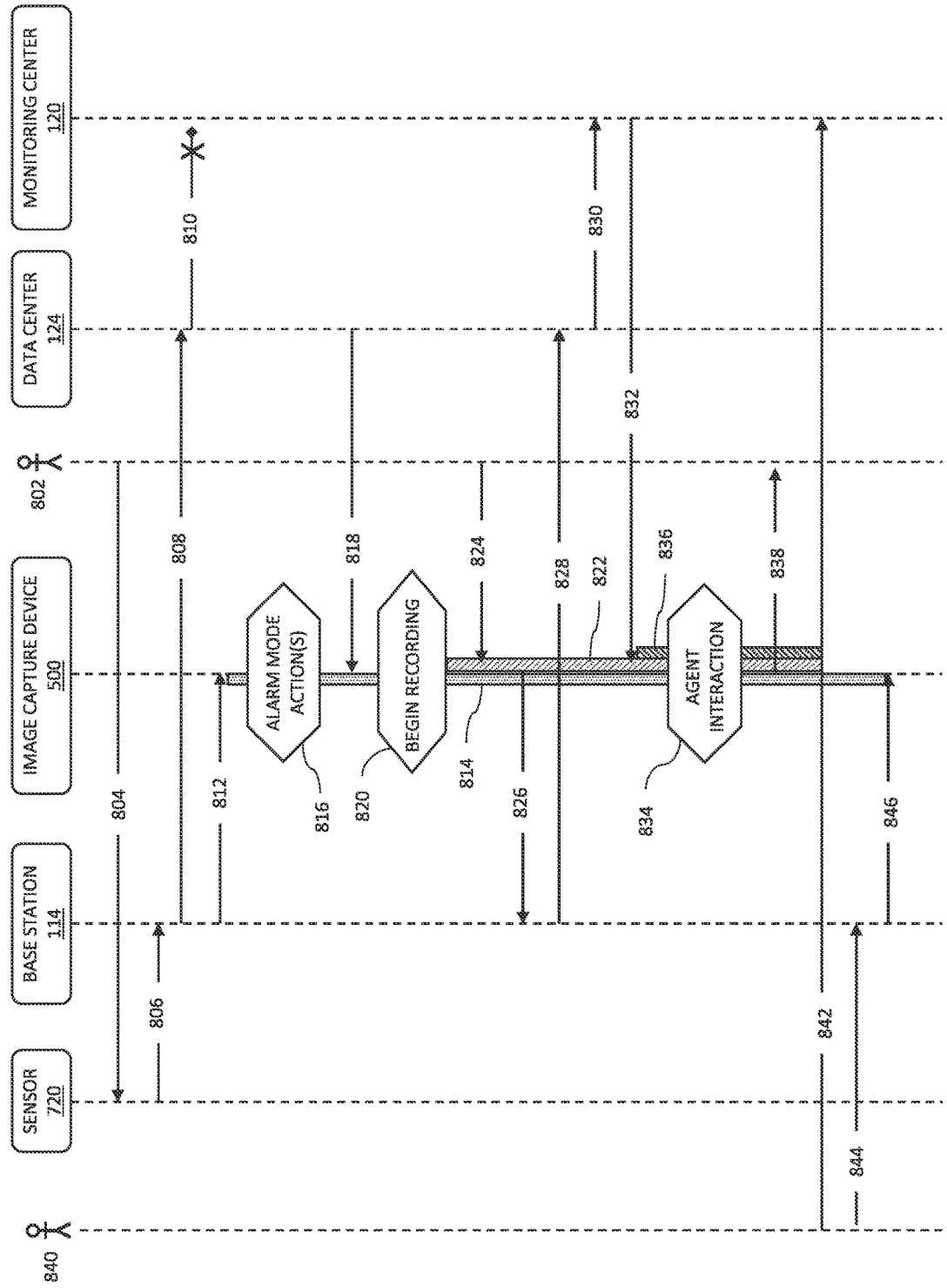
FIG. 8 is a sequence diagram of a monitoring process according to some examples described herein.

Turning now to FIG. 8, there is illustrated an example of a process of responding to a sensor trigger and altering one or more configuration parameters of the image capture device 500 (e.g., the sensitivity of the PIR sensor 712) based on a situation at a monitored location (e.g., the monitored location 102A). The process of FIG. 8 is described below with continuing reference to FIGS. 7 and 8.

In this example, a person or object 802 (e.g., a potential intruder) triggers the sensor 720, as indicated at 804. For example, if the sensor 720 is a contact sensor, such as a door or window sensor, for example, the potential intruder 802 may trigger the sensor 702 by opening (or breaking) the corresponding door or window.

In response to the sensor trigger event indicated at 804, the sensor 720 sends an alarm signal 730 to the base station 114, as indicated at 806. For example, the sensor trigger 722 produces sensor data 732 that is forwarded to the transponder 724, which sends the alarm signal 730 (containing the sensor data 732) to the transponder 726 of the base station 114.

At 808, the base station 114 relays the alarm signal 730 to the data center environment 124 using the wireless interface 728. In some examples, the device control service 702 receives the alarm signal 730 from the base station 114, and provides the alarm signal, or at least some information contained therein, to the signal handling service 704.

As described above, in certain examples, the alarm signal 730 produced by the sensor 720 includes data that identifies the type of sensor that produced the alarm signal 730. For example, the alarm signal 730 may include a message header or other data structure that indicates the type of sensor 720. In some examples, alarm signal 730 may specify the particular type of sensor 720 that produced the alarm signal (e.g., a contact sensor assembly 106, a smoke detector, a security camera, etc.). In other examples, the alarm signal 730 may simply specify whether the originating sensor 720 is a video-capable device or a non-video-capable device. For example, the alarm signal 730 can contain "message type" information, such as a particular code or other piece of information, that is different for different sensors 720. Thus, based on information contained in the alarm signal 730, in particular, the message type information, the signal handling service 704 may determine whether to implement the priority response routine 706 or the standard response routine 708. In some examples, only video-capable devices, such as the image capture device 500, may generate alarm signals that include a message type that is associated with the priority response routine. Thus, by extracting and processing the message type information from the alarm signal 730, the signal handling service 708 may select an appropriate corresponding response routine.

Continuing with the example of FIG. 8, in this instance, the sensor 720 that originated the alarm signal 730 is a non-video-capable device. Accordingly, based on the message type information contained in the alarm signal 730, the signal handling service 704 may determine that the message type is not applicable for the priority response routine 706. The signal handling service 704 may therefore invoke the standard response routine 708, which in some examples, does not include immediately initiating intervention by monitoring personnel at the monitoring center 120. Accordingly, as indicated at 810, the data center environment 124 may not transmit a request for intervention to the monitoring center 120 in response to the alarm signal 730.

According to certain examples, based on receipt of the alarm signal 730, the base station 114 may enter an alarm mode and, as indicated at 812, may instruct the image capture device 500 to enter the alarm mode. In some instances, the instruction from the base station 114 to the image capture device 500 at 812 may include a Boolean variable that describes the alarm mode (e.g., alarm=1). Based on receipt of the instruction, the image capture device may perform certain pre-coded actions, as described further below with reference to FIG. 10B, to reconfigure the image capture device into the alarm mode. In other examples, the instruction from the base station 114 to the image capture device 500 at 812 may include more detailed configuration information, such as data specifying settings such as the sensitivity level of the sensor 712 and or the use of video analytics (e.g., video analytics=0), that can be read by the processor 400 and used to execute reconfiguration actions as described further below with reference to FIG. 10B. In FIG. 8, the duration of the alarm mode is indicated at 814. In some examples, upon entering the alarm mode 814, the image capture device 500 may also automatically activate the recording application 716 to begin recording video imagery of the monitored location. In some examples, this initial recording session may be set to continue for a specified amount of time (e.g., 2 minutes, 3 minutes, etc.). The initial recording session may then terminate at the end of the specified time period unless it is re-triggered (e.g., the time-out period is reset) by another event, such as detection of motion by the image capture device 500, as described further below.

When in the alarm mode, the image capture device 500 may perform various alarm mode actions 816 that may alter one or more configurations or settings of the image capture device 500. In particular, in the alarm mode, the image capture device may be reconfigured to have less specificity to threat detection (e.g., detects more instances of motion and/or associates more classes of detected motion with potential threat conditions) than in the pre-alarm or normal mode. For example, as described above, a sensitivity of a PIR sensor of the image capture device 500 may be increased, as described below with reference to FIG. 10B, so as to increase the likelihood that any moving objects in the field of view of the image capture device 500 will be detected. In some instances, this can be achieved by accessing and altering, with the processor 400, sensor settings stored in the memory 406 of the image capture device, as described below. In some examples, one or more computer vision processes designed to recognize certain objects, such as people or pets, for example, may be disabled. In some instances, this can be achieved through communication of Boolean variables and/or other data among internal components of the image capture device 500, as described further below with reference to FIG. 10B. For example, a video analytics component of the image capture device can be set to "ignore" computer vision-based image processing results by setting a Boolean variable corresponding to the use of such image processing to the "false" (e.g., 0) state, or by overriding the results by setting a corresponding Boolean variable to positive (e.g., object of interest=1) regardless of the actual image processing result. As described above, in a pre-alarm condition, a priority of the security system may be to avoid false alarms. Accordingly, in some examples, the image capture device 500 may, in the pre-alarm condition, employ computer vision processes to identify moving objects and produce alarm signals when a moving object of interest is detected. For example, the image capture device, through the use of computer vision processes, may be configured to produce an alarm signal and begin/continue capturing video images when a person is detected, but not when a pet or object not of interest (e.g., a tree branch, vehicle, etc.) is detected. However, once an alarm occurs, a priority of the security system may transition to providing video imagery of the monitored location 102A, as described above. Accordingly, once in the alarm mode 814, the image capture device 500 may have less specificity to threat detection in that it may be configured to record detected instances of motion, without the "filters" or processes that, in the pre-alarm condition, may prevent a recording (or prevent reset of the recording session time-out period if a recording is already in process), such as the computer vision processes either failing to identify the moving object as a person or other object of interest, or identifying the moving object as an object not of interest (e.g., a pet). Thus, in the alarm mode 814, configuration settings of the image capture device 500 can be altered so as to disable or ignore the computer vision capabilities of the image capture device and cause the image capture device to begin/reset recording video imagery based on any detected motion, as described above and further below with reference to FIG. 10B. Configuration of the image capture device 500 in the pre-alarm condition (or non-alarm mode) and in the alarm mode 814 is described further below with reference to FIGS. 10A and 10B. The alarm mode actions 816 may also include various other actions, such as activating an alarm siren, for example.

Continuing with the example of FIG. 8, and also referring to FIG. 7, based on the alarm signal 730, the device control service 702 in the data center environment 124 may instruct the image capture device 500 to begin/continue recording video imagery of the monitored location 102A, as indicated at 818. The video imagery may include a video data stream and/or one or more still images of the monitored location 102A. For example, as shown in FIG. 7, the device control service 702 may send an instruction signal 734 to the image capture device 500 via the wireless interface 710 of the image capture device. Based on the instruction signal 734, the recording application 716 may be activated to control the image capture device 500 to begin/continue recording video imagery, as indicated at 820. The duration of a recording mode of the image capture device 500 is indicated at 822 in FIG. 8.

Continuing with the example of FIG. 8, while the image capture device 500 is in the recording mode 822, the potential intruder 802 enters the field of view of the image capture device and triggers the PIR sensor 712 to detect a motion event, as indicated at 824. Accordingly, the image capture device 500 sends a motion detection signal 736 to the base station 114, as indicated at 826. Referring to FIG. 7, in some examples, the PIR sensor 712 sends the motion detection signal 736 to the base station 114 via the transponder 714 of the image capture device 500. The base station 114 may receive the motion detection signal 736 via its transponder 726. As described above, detection of such a motion event may reset the time-out period for the recording session 822, thus causing the image capture device 500 to continue recording the video imagery or re-start recording in the event that a previous recording session has already ended.

At 828, the base station 114 relays the motion detection signal 736 to the data center environment 124. As shown in FIG. 7, in some examples, the base station 114 relays the motion detection signal 736 to the device control service 702 via its wireless interface 728 in the same manner as described above with respect to relaying the alarm signal 730 from the sensor 720. However, in the case of the motion detection signal 736, the message type information may indicate that the motion detection signal 736 originated from a video-capable device, in this instance, the image capture device 500. In examples, the message type information specifies the type of sensor that originated the alarm signal. In some instances, the message type information includes a Boolean variable indicating whether the originating sensor is video-capable or non-video-capable (e.g., video=1 or 0). In other examples, the message type information may include more detailed information about the originating sensor, such as indicating with more specificity the type of sensor (e.g., a motion sensor, a door lock sensor, a camera, etc.). In some such examples, components of the security system (e.g., the sensor(s), base station, data center environment, etc.) may store (e.g., in an associated computer storage device) a look-up table or other data structure that associates each type of sensor with a code (e.g., a number, letter, combination thereof, etc.) that identifies the type of sensor (e.g., camera=1, door lock sensor=2, etc.). The message type information may then include the code to identify the type of sensor that originated the alarm signal. Accordingly, based on the message type information, the signal handling service 704 may determine whether or not the priority response routine 706 should be initiated. For example, the signal handling service can be programmed to select the priority response routine based on one or more certain types of sensors originating the alarm signal, such as a video-capable sensor type. Thus, in the example of FIG. 8, since the motion detection signal 736 originated from a video-capable device (the image capture device 500), the message type information specifies a video-capable device, and therefore, the signal handling service 704 determines that the priority response routine 706 is to be initiated. As described above, in some examples, the priority response routine 706 includes engaging monitoring center personnel to intervene at the monitored location 102A through interactions via the image capture device 500.

Accordingly, at 830, a message indicating that a motion alarm has been triggered by a video-capable device is sent from the data center environment 124 to the monitoring center 120.

At 832, a monitoring agent initiates agent interaction 834 with the image capture device 500. The duration of the agent interaction 834 is shown at 836. In some examples, the agent interaction 834 includes viewing by the monitoring agent of the recorded video imagery from the image capture device 500. In some examples, the agent interaction 834 includes agent interaction with the potential intruder 802 via the camera and/or microphone of the image capture device 500, as indicated at 838. Accordingly, referring again to FIG. 7, the priority response routine 706 may include activating the communication (e.g., WebRTC) client 718 in the image capture device 500 to enable a communication session between the monitoring agent and a person at the monitored location 102A (e.g., the potential intruder 802 or an owner 840 of the security system).

Figure 9:
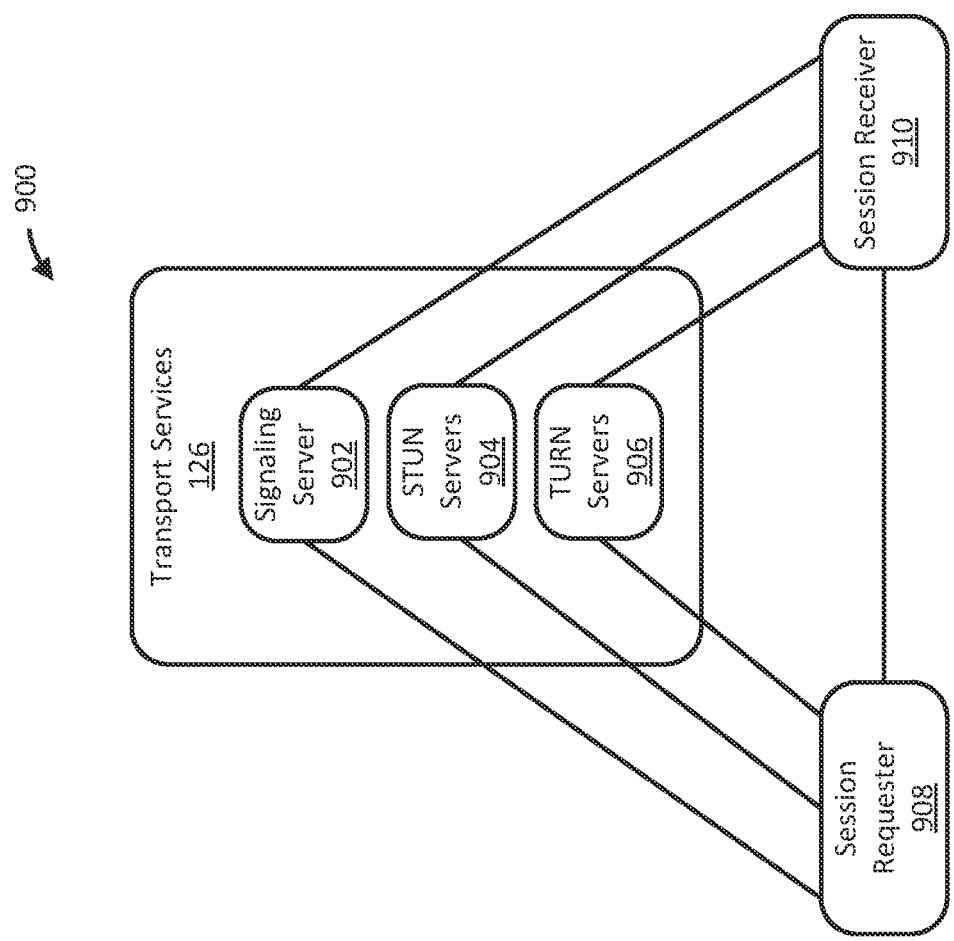
FIG. 9 is a schematic of processes involved in establishing and conducting real-time communication sessions, according to some examples disclosed herein.

Turning now to FIG. 9, a set of processes 900 involved in establishing and conducting a communication session (e.g., a real-time communication session) via the WebRTC client 718 is illustrated as a schematic diagram. As shown in FIG. 15, the set of processes 1500 includes the transport services 126, which are described above with reference to FIGS. 1 and 5. As is further shown in FIG. 9, the transport services 126 include a signaling server 902, one or more Session Traversal Utilities for Network Address Translators (STUN) servers 904, and one or more Traversal Using Relays around Network Address Translators (TURN) servers 906. The set of processes 900 further includes a session requester 908 and a session receiver 910. In the example of FIG. 8, the requester 908 is the monitor interface 130A described above with reference to FIGS. 1 and 5 (which is accessed by the monitoring agent), and the receiver 910 is the image capture device 500 utilizing the WebRTC client 718.

In some examples, during the agent interaction 834, the requester 908 is configured to communicate with the receiver 910 via the signaling server 902 to establish a real-time communication session via, for example, a WebRTC framework. The signaling server 902 is configured to act as an intermediary or broker between the requester 908 and the receiver 910 while a communication session is established. As such, in some examples, an address (e.g., an IP address and port) of the signaling server 902 is accessible to both the requester 908 and the receiver 910. For instance, the IP address and port number of the signaling server 902 may be stored as configuration data in memory local to the devices hosting the requester 908 and the receiver 910. In some examples, the receiver 910 is configured to retrieve the address of the signaling server 902 and to register with the signaling server 902 during initialization to notify the signaling server of its availability for real-time communication sessions. In these examples, the requester 908 is configured to retrieve the address of the signaling server 902 and to connect with the signaling server 902 to initiate communication with the receiver 910 as part of establishing a communication session with the receiver 910. In this way, the signaling server 902 provides a central point of contact for a host of requesters including the requester 908 and a central point of administration of a host of receivers including the receiver 910.

Continuing with the example of FIG. 9, the STUN servers 904 receive, process, and respond to requests from other devices seeking their own public IP addresses. In some examples, individual requesters 908 and the receiver 910 are configured to interoperate with the STUN servers 904 to determine the public IP address of its host device. The TURN servers 906 receive, process, and forward WebRTC messages from one device to another. In some examples, individual requesters 908 and the receiver 910 are configured to interoperate with the TURN servers 906, if a WebRTC session that utilizes the public IP addresses of the host devices cannot be established (e.g., a network translation device, such as a firewall, is interposed between the host devices).

In some examples, a requester 908 exchanges interactive connectivity establishment (ICE) messages with the STUN servers 904 and/or the TURN servers 906. Via this exchange of the messages, the requester 908 generates one or more ICE candidates and includes the one or more ICE candidates within a message specifying an SDP offer. Next, the requester 908 transmits the message to the signaling server 902, and the signaling server 902 transmits the message to the receiver 910. The receiver 910 exchanges ICE messages with the STUN servers 904 and/or the TURN servers 906, generates one or more ICE candidates and includes the one or more ICE candidates within a response specifying an SDP answer. Next, the receiver 910 transmits the response to the signaling server 902, and the signaling server 902 transmits the response to the requester 908. Via the messages, the requester 908 and the receiver 910 negotiate communication parameters for a real-time communication session and open the real-time communication session.

In some examples, while participating in the real-time communication session, the receiver 910 (e.g., the image capture device 500) collects audio-visual sensor data (e.g., through a camera and microphone of the image capture device 500) and transmits the audio-visual sensor data to the requester 908. Further, in these examples, while participating in the real-time communication session, the receiver 910 outputs audio (e.g., via a speaker within the image capture device 500) received from the requester 908. In a similar fashion, while participating in the real-time communication session, the requester 908 renders (e.g., via a display and speaker in the monitoring center environment 120 of FIG. 1) the audio-visual sensor data collected by the receiver 910. Further, while participating in the real-time communication session, the requester 908 collects audio data (e.g., through a microphone of the monitoring center environment 120) and transmits the audio data to the receiver 910. In this way, the monitoring agent can interact with an individual at the monitored location 102A in real-time to help dispose of the alarm.

Returning to FIG. 8, at 842, the owner 840 may clear the alarm condition via communication with personnel at the monitoring center 120 (e.g., the monitoring agent or another person). When the alarm is cleared at 842, the agent interaction 834 may terminate, and the image capture device 500 may stop recording video imagery, as shown at 836 and 822, respectively.

At 844, the owner 840 may disarm the local security system 700, thus causing the base station 114 to exit the alarm mode. In some examples, the base station 114 may "self-exit" from the alarm mode based on a time-out setting, which may be stored in a memory component (e.g., memory 206) of the base station 114. For example, if a new alarm signal is not triggered to reset a specified time-out duration, the base station 114 may exit the alarm mode at the end of the time-out duration, even if not disarmed by the owner 840. The time-out duration may be configurable by the owner 840. In some examples, the time-out duration may be 30 seconds, 1 minute, several minutes (e.g., 3, 4, 8, minutes, etc.) or some other time period, which may be selected by the owner 840. The base station 114 may communicate with the image capture device 500 (e.g., via the RF transponders 714, 726) to cause the image capture device to exit the alarm mode and return to a normal, pre-alarm monitoring mode, as indicated at 846. For example, the base station 114 may communicate the alarm mode status in the form of a Boolean variable (e.g., alarm=0), as described above. Accordingly, as shown in FIG. 8, based on the instructions/information obtained from the base station 114 at 846, the image capture device 500 may stop any ongoing alarm actions 816 and reset any configurations that were changed in the alarm mode back to the pre-alarm, or normal monitoring mode, condition.

Figure 10A:
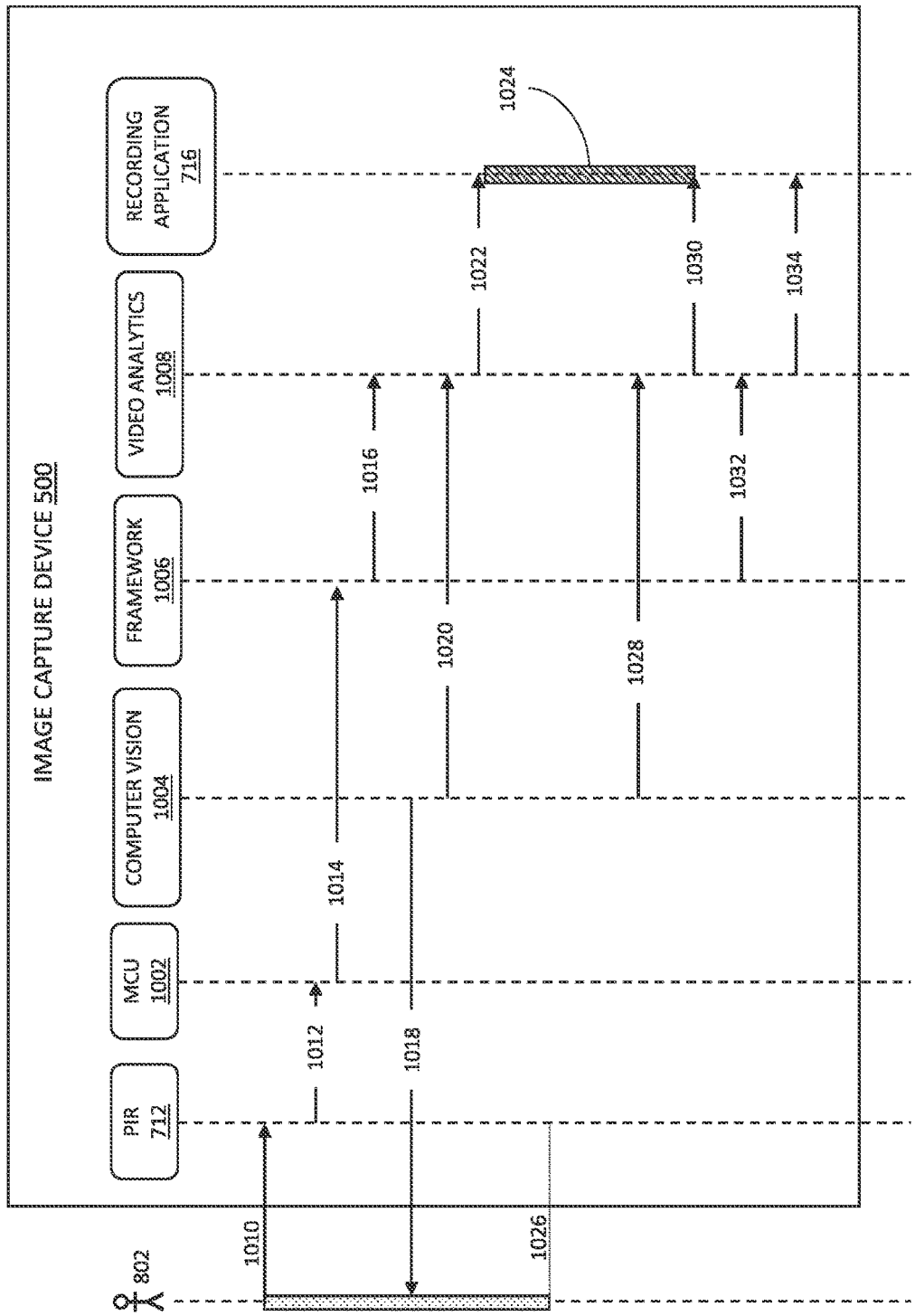
FIG. 10A is a sequence diagram of a process of person detection according to some examples described herein.
Figure 10B:
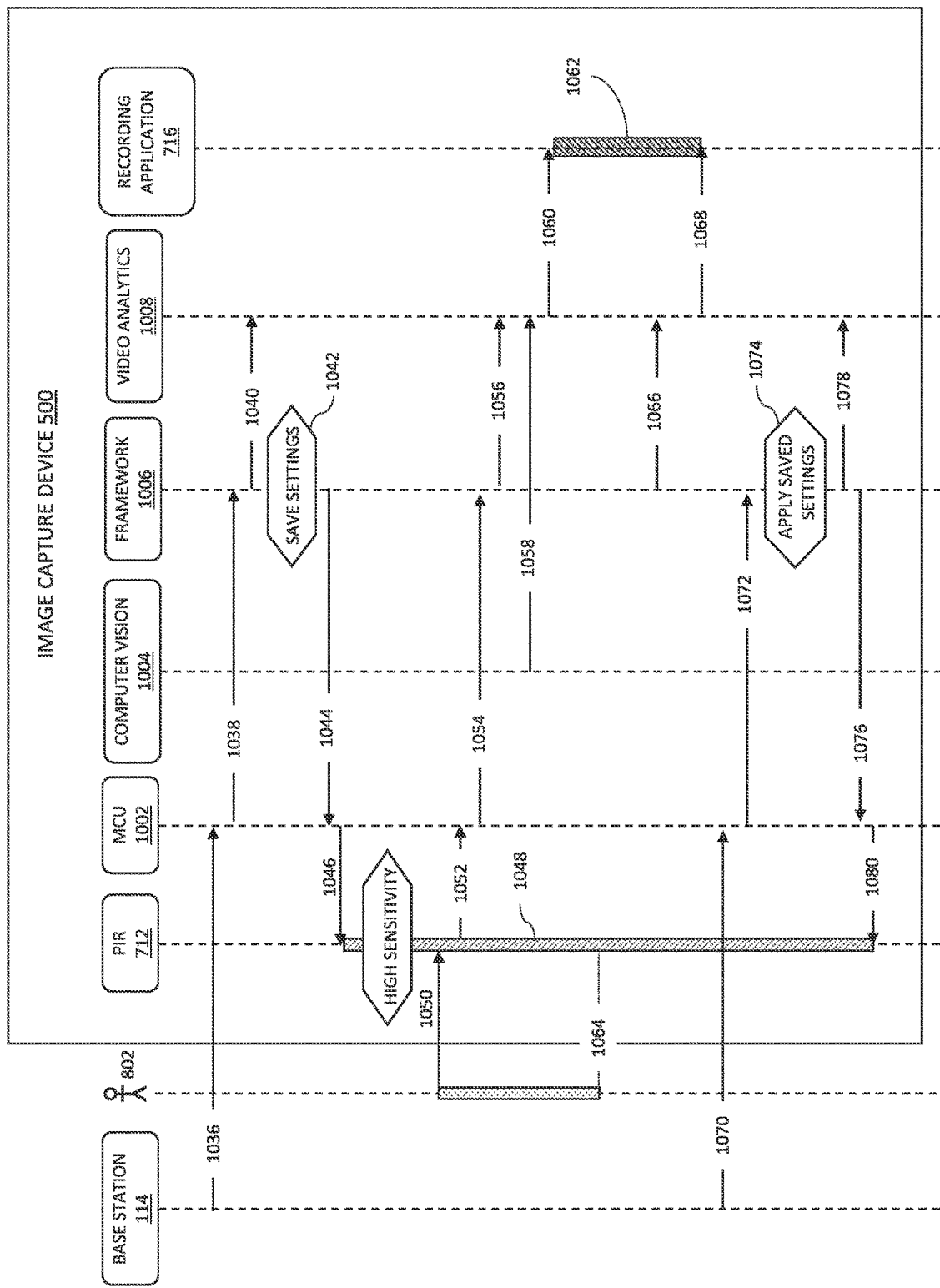
FIG. 10B is a sequence diagram of a process of altering camera sensitivity during an alarm condition according to some examples described herein.

As described above, in certain examples, configurations of the image capture device 500 that may be changed in the alarm mode may include the sensitivity of the PIR sensor 712 and/or the use of computer vision processes and video analytics to analyze acquired images and filter alarm decisions based on objects detected in the images. For example, as discussed above, the image capture device 500 may be configured to generate an alarm signal based on detection of a person, but not based on detection of a pet or other object not of interest. FIGS. 10A and 10B are sequence diagrams of processes that may be performed based on person detection. FIG. 10A provides an example when the image capture device 500 is not in the alarm mode, and FIG. 10B provides an example when the image capture device 500 is in the alarm mode. These examples illustrate certain configuration settings that can be altered in the image capture device 500 based on its mode of operation. It will be appreciated that numerous other examples of sequences may be implemented/performed, which may involve alteration of one or more other configuration settings of the image capture device 500.

As illustrated in FIGS. 10A and 10B, in some examples, the image capture device 500 includes one or more microprocessors 1002, such as the processor 400, for example. The image capture device 500 may further include computer vision capabilities 1004 and video analytics 1008, which may be implemented using hardware, software, firmware, or any combination thereof. In some examples, at least a portion of the computer vision capabilities and the video analytics 1008 are implemented in software (e.g., as part of the code 408) including instructions that can be executed by the microprocessor 1002. The image capture device 500 further includes a framework 1006 configured to perform, control, and/or direct various operations of the image capture device 500 and its components to perform processes related to motion detection, image processing, and/or alarm signaling. The framework 1006 may also allow interoperation and communication among components of the image capture device 500. The framework 1006 may include hardware, software, firmware, or any combination thereof. In some examples, the framework 1006 may correspond to, include, or be part of, the processor 400, the non-volatile memory 406, the volatile memory 402, the network interface 404, and/or the image sensor assembly 450 described above with reference to FIGS. 4A-C. In some examples, the framework 1006 can be described by a set of rules or other instructions that are encoded in software and executed by the processor 400.

Referring to FIG. 10A, there is illustrated an example of a sequence of processes related to detection of a person 802 when the image capture device is not in the alarm mode.

At 1010, the person enters the field of view of the PIR sensor 712. Accordingly, at 1012, the PIR sensor 712 produces the motion detection signal 736 that may be processed by the microprocessor 1002.

At 1014, the microprocessor 1002 sends a message to the framework 1006 identifying that a motion event has been detected by the PIR sensor 712.

At 1016, the framework passes a message to the video analytics 1008 indicating that the motion event has been detected by the PIR sensor 712. In some examples, this message may include a Boolean variable, as described above. For example, this message may include a logical indication of motion detection by the PIR sensor 712, such as the PIR status being "positive," "true," or binary/logical "1" (e.g., PIR=1), for example. For the purposes of explanation, the following discussion uses a logical 1 to indicate a positive state (e.g., detection) and a logical 0 to indicate a negative state (e.g., no detection).

At 1018, the computer vision capabilities 1004 detect the person 802. In some examples, the computer vision capabilities 1004 can be implemented using an artificial neural network (ANN) that is trained to identify only specific objects of interest, such as people or pets, for example. The ANN may be implemented in software (e.g., as part of the code 408), hardware, firmware, or any combination thereof. The ANN may be configured to perform any of various methods (e.g., a YOLO-based method) of identifying objects in images.

Based on detection of the person 802, at 1020, the computer vision capabilities 1004 pass a message to the video analytics 1008 indicating detection of a person (e.g., human=1).

At 1022, based on positive detection of both motion (PIR=1) and an object of interest (human=1), the video analytics 1008 may instruct the recording application 716 to begin/continue recording video imagery, as described above. For example, if the image capture device 500 has initiated a recording session based on the motion detected by the PIR sensor 712, detection of an object of interest at this stage may reset the recording session time-out duration, as described above, such that the previously-initiated recording session continues, as described above. If no active recording session is ongoing, detection of the object of interest may cause the recording application 716 to begin a new recording session. A recording session is indicated at 1024.

Continuing with the example of FIG. 10A, while the recording session 1024 is ongoing, the person 802 may move out of the field of view of the PIR sensor 712, as indicated at 1026.

Accordingly, at 1028, the computer vision capabilities no longer detect the person 802 in the acquired images, and therefore pass a message to the video analytics 1008 indicating that a person is no longer detected in the current images (human=0).

Since of an object of interest (the person 802 in this example) is no longer visible/detected, the video analytics 1008 instruct the recording application 716 to stop recording, as indicated at 1030. In other examples, at 1030 the image capture device 500 may still be detecting motion via the PIR sensor 712 (e.g., the status is PIR=1, human=0);

however, the recording session 1024 may be terminated because an object of interest is no longer detected by the computer vision capabilities 1004. In other examples, after a motion event is detected by the PIR sensor 712, the framework 1006 may hold the PIR sensor status PIR=1 for a certain time period (even if no new motion is detected during the time period). At expiration of the time period (provided that no new motion is detected to restart/reset the time period), the framework may set the PIR sensor status to PIR=0, and communicate that information to the video analytics 1008, as indicated at 1032.

Thus, at 1034, the system status is PIR=0, human=0, and the recording application 716 is deactivated.

Referring to FIG. 10B, there is illustrated an example of a sequence of processes related to detection of the person 802 when the image capture device is in the alarm mode 814. As described above, in the alarm mode 814, the image capture device can be configured to have less specificity to threat detection than in the pre-alarm mode.

At 1036, the base station 114 sends a message to the image capture device 500 (e.g., via the transponders 714, 726, as described above) to cause the image capture device 500 to enter the alarm mode 814. The base station 114 may send the message at 1036 in response to an alarm signal issued by another device in the local security system 700, such as the sensor 720, for example, as described above with reference to FIG. 8. In other examples, the device in the local security system 700 that triggers the base station 114 to enter the alarm mode 814 is the image capture device 500 itself. For example, the image capture device 500 may detect an instance of motion (e.g., with the PIR sensor 712) and an object to interest associated with the motion, as described above with reference to FIG. 10A. This detection may cause the image capture device 500 to send an alarm signal to the base station 114 via the transponder 714, as described above, thereby causing the base station 114 to enter the alarm mode 814. The base station 114 may then send the message to the image capture device 500 to configure the image capture device 500 into the alarm mode, as indicated at 1036. In another example, the image capture device may be automatically configured into the alarm mode 814 in response to its own detection of an object of interest, without requiring receipt of the message from the base station 114 at 1036.

In some examples, the microprocessor 1002 processes the message received from the base station 114 and directs the framework 1006 to enter the alarm mode, as indicated at 1038.

At 1040, the framework 1006 sends an alarm event message to the video analytics 1008 to indicate to the video analytics 1008 that the image capture device 500 is entering the alarm mode. Therefore, motion detection events and image processing will be handled according to alarm mode procedures, rather than pre-alarm or normal operating mode procedures. At 1042, the framework 1006 may save current configuration settings of the image capture device, such as a current sensitivity level of the PIR sensor 712. At 1044, the framework 1006 may then direct the microprocessor 1002 to alter the sensitivity setting of the PIR sensor 712 to an increased sensitivity level, as described above. For example, where the framework 1006 includes one or more hardware and/or firmware components, the framework 1006 may transmit a message to the microprocessor instructing the microprocessor to access configuration settings of the image capture device 500 to increase the sensitivity of the PIR sensor 712, as described below. Where the framework 1006 is implemented at least in part as a set of rules or instructions executed by the microprocessor 1002, those rules/instructions may include an instruction for the microprocessor 1002 to access configuration settings of the image capture device 500 to increase the sensitivity of the PIR sensor 712, as described below.

At 1046, through direct memory access to configuration settings of the image capture device 500, the microprocessor 1002 may change the sensitivity setting of the PIR sensor 712 to increase the sensitivity of the PIR sensor 712. In normal operating mode of the image capture device 500, various configuration settings, including the sensitivity level of the PIR sensor 712, may be set or controlled by the owner 840 or another person authorized to configure the image capture device 500. As described above, in normal operating mode, a system priority may be to achieve high reliability or confidence in detection so as to minimize the occurrence of false alarms. Accordingly, the PIR sensor 712 may typically be set, by the owner 840 or another person involved in system set-up, to a sensitivity level well below its maximum so as to avoid motion "noise" (e.g., small instances of motion caused by objects not of interest, such as changing light patterns, moving tree branches, etc.) from triggering alarms. However, once the image capture device 500 is in the alarm mode 814, the microprocessor 1002 may be granted direct memory access, e.g., to the memory 406, to automatically alter one or more configuration settings of the image capture device 500 (including the sensitivity setting of the PIR sensor 712) without requiring action by the owner 840 or other authorized personnel. This allows the image capture device 500 to quickly and automatically respond to an alarm event and facilitate transitioning of the system priority from high-confidence in detection to high-availability of video imagery during an alarm condition, as described above. The PIR sensor 712 in the high sensitivity mode is indicated at 1048 in FIG. 10B.

Continuing with the example of FIG. 10B, at 1050, the person 802 enters the field of view of the PIR sensor 712. Accordingly, at 1052, the PIR sensor 712 produces the motion detection signal 736 that may be processed by the microprocessor 1002.

At 1054, the microprocessor 1002 sends a message to the framework 1006 identifying that a motion event has been detected by the PIR sensor 712.

At 1056, the framework passes a message to the video analytics 1008 indicating that the motion event has been detected by the PIR sensor 712 (e.g., PIR=1, as described above).

In one example, the person 802 may be disguised or partially obscured when motion associated with the person 802 is detected by the PIR sensor 712. Accordingly, the computer vision capabilities 1004 may fail to identify the object associated with the motion detected by the PIR sensor 712 as a person. Therefore, the message sent at 1058 from the computer vision capabilities 1004 to the video analytics 1008 may indicate that no person (or other object of interest) was detected (e.g., human=0). As described above, when the image capture device 500 is operating in the normal/pre-alarm mode, this scenario or system status (PIR=1; human=0) would not cause the video analytics 1008 to control the recording application 716 to record video imagery since no object of interest has been detected. However, when the image capture device 500 is in the alarm mode 814 (as indicated to the video analytics 1008 at 1040), the video analytics 1008 can be configured to ignore the output from the computer vision capabilities 1004 and cause the recording application 716 to begin a recording session based on motion detection by the PIR sensor 712 alone. Accordingly, at 1060, based on the motion detection signal 736 from the PIR sensor 712, the video analytics 1008 instructs the recording application 716 to begin recording video imagery. Thus, the recording application 716 begins an active recording session 1062 in response to the instruction received from the video analytics 1008 at 1060.

At 1064, the person 802 exits the field of view of the PIR sensor 712. Accordingly, at 1066, the framework 1006 sends an updated status message (e.g., PIR=0) to the video analytics 1008. In response, the video analytics 1008 instructs the recording application 716 to terminate the recording session 1062, as indicated at 1068. In some examples, the framework 1006 and/or the video analytics 1008 may send the status or instruction messages, respectively, after a specified timeout period. In some examples, the recording application 716 may wait for a specified time period after receiving instructions from the video analytics 1008 and before terminating the recording session 1062.

Continuing with the example of FIG. 10B, the owner 840 (or another authorized person) may clear the alarm condition, as described above with reference to FIG. 8 (e.g., at 844). Accordingly, at 1070, the base station 114 may send a message to the image capture device 500 (e.g., via the RF transponders 714, 726 using a sub-GHz wireless networking standard, as described above) to instruct the microprocessor 1002 to cause the image capture device 500 to exit the alarm mode 814.

At 1072, the microprocessor 1002 instructs the framework 1006 to perform the necessary actions to cause the image capture device 500 to exit the alarm mode 814 and return to the normal (pre-alarm) operating state. Accordingly, at 1074, the framework 1006 accesses the previously saved (at 1042) configuration settings of the image capture device 500 (e.g., the original sensitivity level of the PIR sensor 712), and at 1076, the framework 1006 directs the microprocessor 1002 to apply the original configuration settings. Further, at 1078, the framework 1006 indicates to the video analytics 1008 that the alarm condition has ended.

In the illustrated example, at 1080, the microprocessor 1002, through direct memory access to configuration settings of the image capture device 500 (e.g., stored in the memory 406), returns the sensitivity setting of the PIR sensor 712 to the original setting obtained from the framework 1006.

Thus, the image capture device 500 is returned to the normal/pre-alarm operating mode, and further instances of motion detection by the PIR sensor 712 may be processed according to the sequence illustrated in FIG. 10A, for example.

Figure 11:
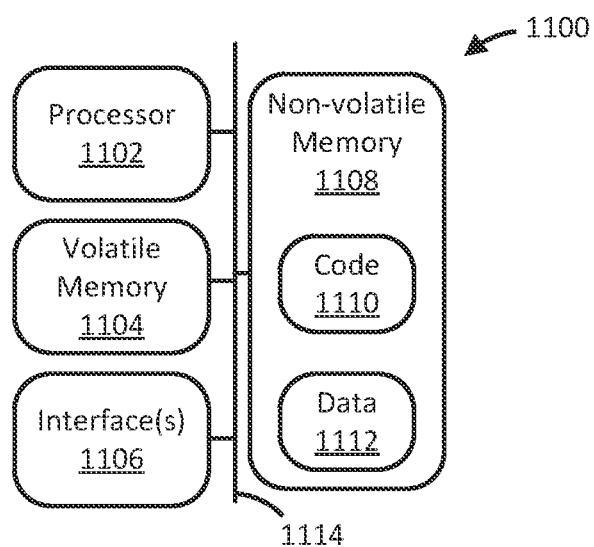
FIG. 11 is a schematic diagram of a computing device, according to some examples described herein.

Turning now to FIG. 11, a computing device 1100 is illustrated schematically. As shown in FIG. 11, the computing device includes at least one processor 1102, volatile memory 1104, one or more interfaces 1106, non-volatile memory 1108, and an interconnection mechanism 1114. The non-volatile memory 1108 includes code 1110 and at least one data store 1112.

In some examples, the non-volatile (non-transitory) memory 1108 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1110 stored in the non-volatile memory can include an operating system and one or more applications or programs that are configured to execute under the operating system. Alternatively or additionally, the code 1110 can include specialized firmware and embedded software that is executable without dependence upon a commercially available operating system. Regardless, execution of the code 1110 can result in manipulated data that may be stored in the data store 1112 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 11, the processor 1102 can be one or more programmable processors to execute one or more executable instructions, such as a computer program specified by the code 1110, to control the operations of the computing device 1100. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1104) and executed by the circuitry. In some examples, the processor 1102 is a digital processor, but the processor 1102 can be analog, digital, or mixed. As such, the processor 1102 can execute the function, operation, or sequence of operations using digital values and/or using analog signals. In some examples, the processor 1102 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1102 that are multicore can provide functionality for parallel, simultaneous execution of instructions or for parallel, simultaneous execution of one instruction on more than one piece of data.

Continuing with the example of FIG. 11, prior to execution of the code 1110 the processor 1102 can copy the code 1110 from the non-volatile memory 1108 to the volatile memory 1104. In some examples, the volatile memory 1104 includes one or more static or dynamic random access memory (RAM) chips and/or cache memory (e.g. memory disposed on a silicon die of the processor 1102). Volatile memory 1104 can offer a faster response time than a main memory, such as the non-volatile memory 1108.

Through execution of the code 1110, the processor 1102 can control operation of the interfaces 1106. The interfaces 1106 can include network interfaces. These network interfaces can include one or more physical interfaces (e.g., a radio, an ethernet port, a USB port, etc.) and a software stack including drivers and/or other code 1110 that is configured to communicate with the one or more physical interfaces to support one or more LAN, PAN, and/or WAN standard communication protocols. The communication protocols can include, for example, TCP and UDP among others. As such, the network interfaces enable the computing device 1100 to access and communicate with other computing devices via a computer network.

The interfaces 1106 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1110 that is configured to communicate with the user input and/or output devices. As such, the user interfaces enable the computing device 1100 to interact with users to receive input and/or render output. This rendered output can include, for instance, one or more GUIs including one or more controls configured to display output and/or receive input. The input can specify values to be stored in the data store 1112. The output can indicate values stored in the data store 1112.

Continuing with the example of FIG. 11, the various features of the computing device 1100 described above can communicate with one another via the interconnection mechanism 1114. In some examples, the interconnection mechanism 1114 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method comprising operating a camera in a first mode, based on detection of an alarm condition at a location of the camera, adjusting the camera from the first mode to a second mode, including increasing a sensitivity setting of at least one sensor of the camera, and disabling use of object detection within the camera.

Example 2 includes the subject matter of Example 1, wherein the camera includes a passive infrared sensor, and wherein increasing the sensitivity setting includes increasing a sensitivity setting of the passive infrared sensor.

Example 3 includes the subject matter of Example 2, wherein increasing the sensitivity setting of the passive infrared sensor includes accessing, with at least one processor of the camera, a memory of the camera storing the sensitivity setting of the passive infrared sensor.

Example 4 includes the subject matter of any of Examples 1-3 and further comprising operating the camera in the second mode while the alarm condition persists, and based on detection of termination of the alarm condition, adjusting the camera from the second mode to the first mode.

Example 5 includes the subject matter of Example 4, wherein adjusting the camera from the second mode to the first mode includes restoring the sensitivity setting of the at least one sensor to a pre-alarm value, and re-enabling use of object detection within the camera.

Example 6 includes the subject matter of any of Examples 1-5 and further comprising detecting a first signal indicative of the alarm condition at the location, determining a sensor type responsible for initiating the alarm condition based on the first signal, and based on the sensor type, initiating one of a first or second routine in response to the alarm condition, wherein the first routine includes at least one action not present in the second routine.

Example 7 includes the subject matter of Example 6, wherein the at least one action includes establishing a communication session between the camera and a remote computing device, and wherein initiating one of the first or second routines includes initiating the first routine based on the sensor type being a video-capable sensor or initiating the second routine based on the sensor type being a non-video-capable sensor.

Example 8 includes the subject matter of Example 7, wherein establishing the communication session includes establishing a real-time communication session using a web real-time communication service at the camera and a monitor interface at the remote computing device.

Example 9 includes the subject matter of Example 8 and further comprising accessing, via the monitor interface, video imagery recorded by the camera.

Example 10 includes the subject matter of any of Examples 1-9, wherein the camera includes a radio frequency (RF) transponder, and wherein detecting the alarm condition includes receiving at the camera, using the RF transponder, a message transmitted over a point-to-point sub-GHz wireless network between a base station at the location and the camera.

Example 11 includes the subject matter of any of Examples 1-10 and further comprising recording video imagery of the location with the camera.

Example 12 is a system comprising a camera that includes a passive infrared sensor configured to detect motion events, a communication interface, a recording application configured to record video imagery, and one or more processors configured to alter a configuration of the camera from a first state to a second state based on receiving a signal via the communication interface, the signal being indicative of an alarm condition at a location of the camera, wherein to alter the configuration of the camera from the first state to the second state includes to increase a sensitivity of the passive infrared sensor and to disable use of object detection within the camera.

Example 13 includes the subject matter of Example 12, wherein the signal is a first signal and the system further comprises at least one sensor, and a base station configured to detect a second signal from the at least one sensor, the second signal indicating the alarm condition detected by the at least one sensor, and transmit the first signal to the camera based on detecting the second signal.

Example 14 includes the subject matter of Example 13, wherein the communication interface of the camera includes a first radio frequency (RF) transponder, wherein the base station includes a second RF transponder, the first and second RF transponders being configured to communicate over a sub-GHz wireless network, and wherein the base station is configured to transmit the first signal over the sub-GHz wireless network.

Example 15 includes the subject matter of any of Examples 12-14, wherein the one or more processors are further configured to reset the configuration of the camera from the second state to the first state based on receiving a second signal, the second signal being indicative of termination of the alarm condition.

Example 16 includes the subject matter of any of Examples 12-15, wherein the camera is configured to detect a motion event with the passive infrared sensor, in the first state, (i) acquire at least one frame of image data, (ii) process the at least one frame of image data using computer vision-based object detection to determine whether an object of interest is present in the at least one frame of image data, and (iii) based on detecting the object of interest, control a recording application to record video imagery of the location, and in the second state, control the recording application to record the video imagery based on detecting the motion event with the passive infrared sensor.

Example 17 provides one or more computer readable media storing sequences of instructions executable to control a security camera disposed at a location, the sequences of instructions comprising instructions to based on detecting an alarm condition at the location, automatically reconfigure the security camera from a first mode to a second mode having less specificity to threat detection than the first mode, wherein reconfiguring the security camera from the first mode to the second mode includes increasing a sensitivity of a passive infrared sensor in the security camera from a pre-alarm setting to an alarm setting, and disabling use of object detection within the security camera.

Example 18 includes the subject matter of Example 17, wherein the sequences of instructions comprise instructions to based on detecting termination of the alarm condition, automatically reconfigure the camera from the second mode to the first mode, including returning the sensitivity of the passive infrared sensor to the pre-alarm setting.

Example 19 includes the subject matter of Example 17 or Example 18, wherein the sequences of instructions comprise instructions to, based on detecting a motion event with the passive infrared sensor, cause the security camera to acquire at least one frame of image data.

Example 20 includes the subject matter of Example 19, wherein the sequences of instructions comprise instructions to control the security camera in the first mode to process the at least one frame of image data using the object detection to determine whether an object of interest is present in the at least one frame of image data, and, based on detecting the object of interest, control the security camera to record video imagery of the location, and wherein the sequences of instructions comprise instructions to control the security camera in the second mode to record the video imagery based on detection of the motion event.

Example 21 is a method comprising detecting an alarm condition at a location, based on detection of the alarm condition, automatically adjusting a camera at the location from a first mode to a second mode having less specificity to threat detection than the first mode, while the alarm condition persists, operating the camera in the second mode, detecting termination of the alarm condition, and based on detection of the termination, automatically adjusting the camera from the second mode to the first mode.

Example 21 includes the subject matter of Example 20, wherein the camera includes a passive infrared sensor, and wherein adjusting the camera from the first mode to the second mode includes increasing a sensitivity setting of the passive infrared camera.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:
operating a camera in a first mode; and
based on detection of an alarm condition at a location of the camera, adjusting the camera from the first mode to a second mode, including
increasing a sensitivity setting of a passive infrared sensor of the camera, and
disabling use of object detection within the camera.

2. The method of claim 1, wherein increasing the sensitivity setting of the passive infrared sensor includes accessing, with at least one processor of the camera, a memory of the camera storing the sensitivity setting of the passive infrared sensor.

3. The method of claim 1, further comprising:
operating the camera in the second mode while the alarm condition persists; and
based on detection of termination of the alarm condition, adjusting the camera from the second mode to the first mode.

4. The method of claim 3, wherein adjusting the camera from the second mode to the first mode includes:
restoring the sensitivity setting of the passive infrared sensor to a pre-alarm value; and
re-enabling use of object detection within the camera.

5. The method of claim 1, further comprising:
detecting a first signal indicative of the alarm condition at the location;
determining a sensor type responsible for initiating the alarm condition based on the first signal; and
based on the sensor type, initiating one of a first or second routine in response to the alarm condition, wherein the first routine includes at least one action not present in the second routine.

6. The method of claim 5, wherein the at least one action includes establishing a communication session between the camera and a remote computing device; and
wherein initiating one of the first or second routines includes initiating the first routine based on the sensor type being a video-capable sensor or initiating the second routine based on the sensor type being a non-video-capable sensor.

7. The method of claim 6, wherein establishing the communication session includes establishing a real-time communication session using a web real-time communication service at the camera and a monitor interface at the remote computing device.

8. The method of claim 7, further comprising:
accessing, via the monitor interface, video imagery recorded by the camera.

9. The method of claim 1, wherein the camera includes a radio frequency (RF) transponder, and wherein detecting the alarm condition includes receiving at the camera, using the RF transponder, a message transmitted over a point-to-point sub-GHz wireless network between a base station at the location and the camera.

10. The method of claim 1, further comprising:
recording video imagery of the location with the camera.

11. A system comprising:
a camera including
a passive infrared sensor configured to detect motion events,
a communication interface,
a recording application configured to record video imagery, and
one or more processors configured to alter a configuration of the camera from a first state to a second state based on receiving a signal via the communication interface, the signal being indicative of an alarm condition at a location of the camera;
wherein to alter the configuration of the camera from the first state to the second state includes to increase a sensitivity of the passive infrared sensor and to disable use of object detection within the camera.

12. The system of claim 11, wherein the signal is a first signal, the system further comprising:
at least one sensor; and
a base station configured to
detect a second signal from the at least one sensor, the second signal indicating the alarm condition detected by the at least one sensor, and
transmit the first signal to the camera based on detecting the second signal.

13. The system of claim 12, wherein the communication interface of the camera includes a first radio frequency (RF) transponder;

wherein the base station includes a second RF transponder, the first and second RF transponders being configured to communicate over a sub-GHz wireless network; and wherein the base station is configured to transmit the first signal over the sub-GHz wireless network.

14. The system of claim 11, wherein the one or more processors are further configured to reset the configuration of the camera from the second state to the first state based on receiving a second signal, the second signal being indicative of termination of the alarm condition.

15. The system of claim 11, wherein the camera is configured to:
   detect a motion event with the passive infrared sensor;
   in the first state,
      (i) acquire at least one frame of image data,
      (ii) process the at least one frame of image data using computer vision-based object detection to determine whether an object of interest is present in the at least one frame of image data, and
      (iii) based on detecting the object of interest, control the recording application to record video imagery of the location; and
   in the second state, control the recording application to record the video imagery based on detecting the motion event with the passive infrared sensor.

16. One or more non-transitory computer readable media storing sequences of instructions executable to control a security camera disposed at a location, the sequences of instructions comprising instructions to:
   based on detecting an alarm condition at the location, automatically reconfigure the security camera from a first mode to a second mode having less specificity to threat detection than the first mode, wherein reconfiguring the security camera from the first mode to the second mode includes
      increasing a sensitivity of a passive infrared sensor in the security camera from a pre-alarm setting to an alarm setting, and
      disabling use of object detection within the security camera.

17. The one or more non-transitory computer readable media of claim 16, wherein the sequences of instructions comprise instructions to:
   based on detecting termination of the alarm condition, automatically reconfigure the camera from the second mode to the first mode, including returning the sensitivity of the passive infrared sensor to the pre-alarm setting.

18. The one or more non-transitory computer readable media of claim 16, wherein the sequences of instructions comprise instructions to:
   based on detecting a motion event with the passive infrared sensor, cause the security camera to acquire at least one frame of image data.

19. The one or more non-transitory computer readable media of claim 18, wherein the sequences of instructions comprise instructions to control the security camera, in the first mode to:
   process the at least one frame of image data using the object detection to determine whether an object of interest is present in the at least one frame of image data, and
   based on detecting the object of interest, control the security camera to record video imagery of the location; and
   wherein the sequences of instructions comprise instructions to control the security camera in the second mode to:
   record the video imagery based on detection of the motion event.

* * * * *